March 18, 1941. J. H. SMITH 2,235,594
SAFETY SHIELD FOR WELDING TORCHES
Filed Dec. 19, 1939
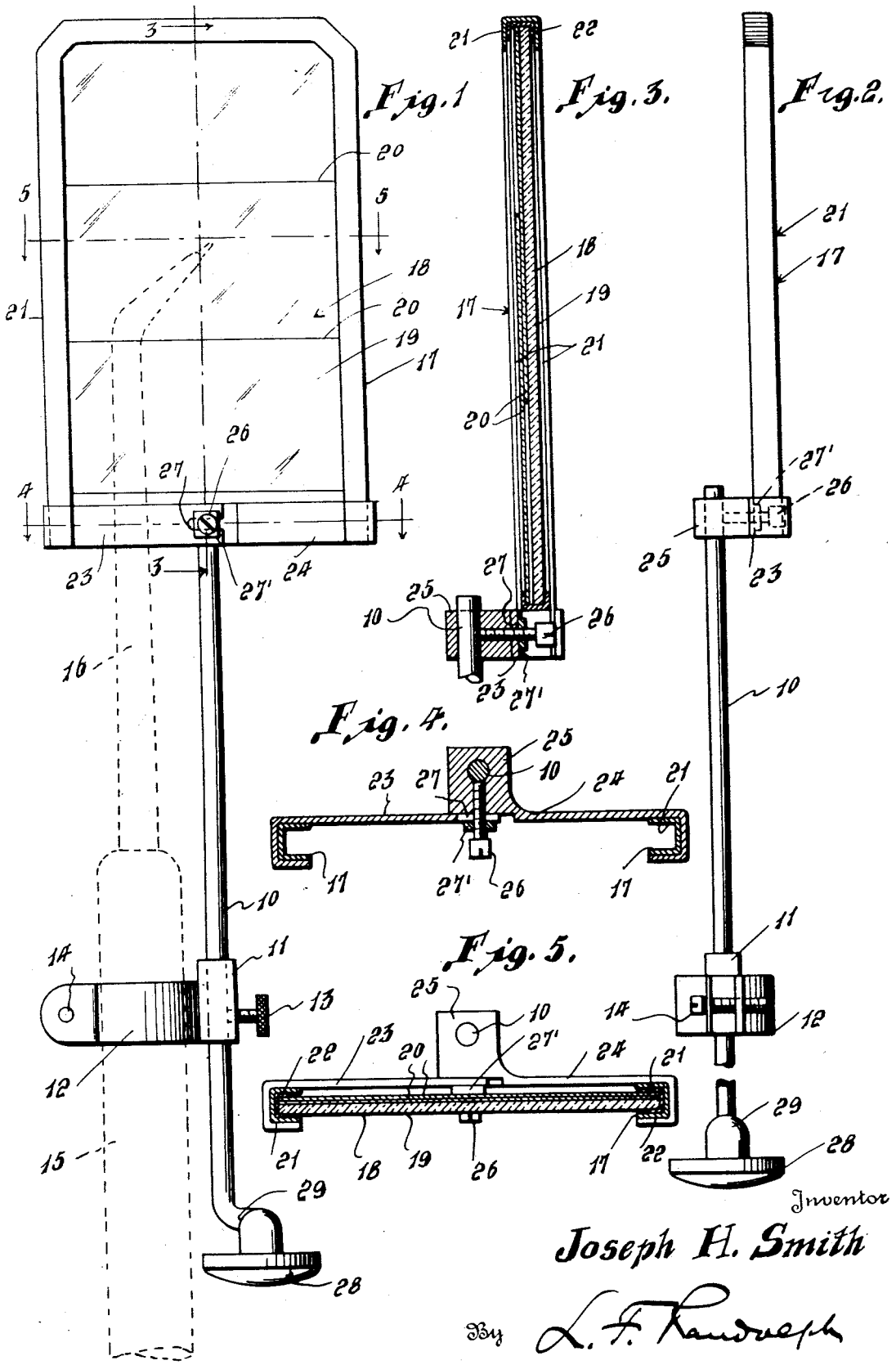
Inventor
Joseph H. Smith
By L. F. Randolph
Attorney Patented Mar. 18, 1941

2,235,594

UNITED STATES PATENT OFFICE 2,235,594

SAFETY SHIELD FOR WELDING TORCHES

Joseph H. Smith, Whittier, Calif.

Application December 19, 1939, Serial No. 310,088

2 Claims. (Cl. 189—34)

This invention relates to a shield primarily adapted for use on welding torches such as are used in oxygen-acetylene welding or the equivalent, and it aims generally to provide such a shield as will protect the face and eyes from flying sparks, bright lights, glare, heat and the like.

It is also aimed to provide such a construction as will render it unnecessary for the operator to wear goggles and will accordingly avoid undue sweat around the eyes, a construction which is light in weight, quickly applicable and removable, is adjustable, may be installed on different tips, and a construction in which welding may be more efficiently carried out.

I further aim to provide the structure of a size which will protect the chest against flying sparks, as well as the face.

The more specific objects and advantages will become apparent from a consideration of the description following taken in connection with accompanying drawing illustrating an operative embodiment.

In said drawing—

Figure 1 is a view in elevation showing the shield as applied to a welding torch, the latter being shown in dotted lines;

Figure 2 is a view of the shield in edge elevation, taken at a right angle to Figure 1;

Figure 3 is a vertical section taken on the line 3—3 of Figure 1;

Figure 4 is a horizontal section taken on the line 4—4 of Figure 1, and

Figure 5 is a horizontal section taken on the line 5—5 of Figure 1.

Referring specifically to the drawing wherein like reference characters designate like or similar parts, my improvements embody a rod or shaft at 10 which is longitudinally slidable and rotatable in a tube 11 forming part of a generally U-shaped clamp 12. The rod 10 is fastened in adjusted positions in the tube 11 by means of a set screw 13. A screw 14, connects the free ends of the clamp 12 in order to rigidly secure the same around the handle 15 of a welding torch. At 16, the tip of the welding torch is shown extending from the handle 15. It is to be understood that the welding torch 15—16 is of conventional form and that the invention may be attached to various constructions thereof by means of the clamp 12 or the equivalent.

A frame 17 is adjustably carried by the rod 10 and mounts in a manner to be specifically described, a shielding means 18 disposed relatively close to the flame end of the tip 16, and is positioned between the tip and the operator, so as to protect the operator against flying sparks. Such shielding means 18 preferably comprises a glass panel or light 19 of any desired color, for instance red, green, brown, smoked or the like and in fact otherwise than opaque. Disposed against the glass 19, at the side thereof, adjacent the tip 16, are one or more sheets 20 of mica, suitably translucent or transparent, to protect the glass 19 against excessive heat and which mica may be discarded and replaced whenever desired, especially should it become pitted by the heat or flame from the torch.

Reverting to the frame 17, it has a U-shaped marginal portion 21 extending across the top and the two sides thereof, the frame also being made U-shaped or channel shaped in cross section and lined with a strip 22 of U-shape in cross section, of asbestos or the like removably, and which is fastened or bound around the marginal edges of the glass 19 and mica 20 forming substantially a unit thereof, although permitting removal of the mica from the glass when desired.

Said frame 17 is open at the bottom to enable insertion and removal of the unit 19—20—22 and at such bottom, and at the rear of the frame, bars 23 and 24 are welded or united to the back of the frame 17. Bar 24 has integral with it a block or bearing 25 having an opening occupied adjustably by the rod 10 and on which rod the shield is slidable and rotatable, being fastened rigidly to the rod by a screw or the like 26.

The bar 23 at its inner end is slotted as at 27 and slidable on the bar 24 and its block 25. The frame 17 is resilient so as to be expansive especially at the lower end in order to urge the bar 23 to a predetermined extent away from the bar 24 to widen the legs of the frame 17 to facilitate the insertion and removal of the shield unit 19—20—22.

It is to be understood that such unit is inserted before the screw 26 is applied and that after the screw 26 is applied, it is located in the path of detachment of the unit, guarding against accidental removal of the latter. The said slot 27 accommodates the screw 26 therethrough and it will be noted that a nut 27' is threaded onto the screw 26. Thus after the unit 19—20—22 is in place, the bar 23 is moved by sliding it along the bar 24 and block 25, to the maximum extent to secure the shield unit in place and thereafter the nut 27' is tightened against the inner end portion of the bar 23 to hold the frame in proper relation about the shield unit.

It is to be realized that the shield may be elevated or rotated or disposed at any position with respect to the tip of the torch as desired. To facilitate the sliding of the rod 10 and turning thereof, a knob 28 may be fastened to the lower end thereof at a crank portion 29, which is in a position for ready engagement by the welder.

Various changes may be resorted to provided they fall within the spirit and scope of the invention as defined by the appended claims.

I claim as my invention:

1. A shielding device of the class described comprising a frame open at the lower end, downwardly removable diaphanous means in said frame, supporting means for the frame, and a fastening securing the frame to the supporting means disposed in the path of removal of said diaphanous means.

2. A shielding device of the class described comprising a frame open at the lower end, said frame having a groove, downwardly removable diaphanous means in said groove, supporting means for the frame, a fastening securing the frame to the supporting means disposed in the path of removal of said diaphanous means, said frame being expansive at the lower portion to facilitate insertion and removal of the diaphanous means, bars extending inwardly from opposite sides of the frame at said portion, and said fastening also extending through said bars to secure the latter in contracted position.

JOSEPH H. SMITH.